(12) United States Patent
Ide

(10) Patent No.: US 7,849,124 B2
(45) Date of Patent: Dec. 7, 2010

(54) METHOD AND SYSTEM FOR DETECTING DIFFERENCE BETWEEN PLURAL OBSERVED RESULTS

(75) Inventor: Tsuyoshi Ide, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/264,556

(22) Filed: Nov. 4, 2008

(65) Prior Publication Data

US 2009/0132626 A1    May 21, 2009

Related U.S. Application Data

(63) Continuation of application No. 11/768,967, filed on Jun. 27, 2007, now abandoned.

(30) Foreign Application Priority Data

Jul. 10, 2006    (JP)    .............................. 2006-189301

(51) Int. Cl.
*G06F 17/15*    (2006.01)
(52) U.S. Cl. ..................................... 708/422
(58) Field of Classification Search .......... 708/400–446
See application file for complete search history.

(56) References Cited

U.S. PATENT DOCUMENTS

| 5,046,179 | A | 9/1991 | Uomori et al. | |
| 5,257,364 | A | 10/1993 | Melamed et al. | |
| 5,574,641 | A * | 11/1996 | Kawakami et al. | 708/444 |
| 6,408,321 | B1 * | 6/2002 | Platt | 708/520 |
| 7,162,489 | B2 * | 1/2007 | Folting et al. | 707/102 |
| 7,346,593 | B2 | 3/2008 | Takeuchi et al. | |
| 2005/0050129 | A1 | 3/2005 | Kamatani et al. | |
| 2005/0283511 | A1 * | 12/2005 | Fan et al. | 708/306 |
| 2006/0101402 | A1 * | 5/2006 | Miller et al. | 717/124 |
| 2007/0005297 | A1 | 1/2007 | Beresniewicz et al. | |

OTHER PUBLICATIONS

Office Action from U.S. Appl. No. 11/768,967 dated Nov. 20, 2008.
Keogh, et al.; Dimensionality Reduction for Fast Similarity Search in Large Time Series Databases; 19 pages; May 16, 2000.

(Continued)

*Primary Examiner*—Chat C Do
(74) *Attorney, Agent, or Firm*—Schmeiser, Olsen & Watts; Shimokaji & Assoc.

(57) ABSTRACT

A method and system for analyzing time series data. In an embodiment, a loop is executed and terminated upon a specified maximum number of iterations of the loop being performed or upon a difference between scores in successive iterations of the loop not being greater than a specified tolerance, wherein the score in each iteration is calculated as function of an absolute value of a difference between respective cumulative probability values of first and second cumulative probability distributions which are generated from respectively first and second time series data sets. In an embodiment, time series data is processed in a sequence of time periods, wherein a combined cumulative probability distribution is generated in each time period by combining a cumulative probability distribution of new time series data with previously combined cumulative probability distribution data according to a ratio of the number of new to previous observed values.

1 Claim, 9 Drawing Sheets

OTHER PUBLICATIONS

Ide, et al.; Knowledge Discovery from Heterogeneous Dynamic Systems using Change-Point Correlations; 5 pages; Oct. 4, 2004.

Linear Algebra and its application, Gilbert Strang, sangho-tosho, 1978; pp. 156-157.

Pattern Recognition, Kenichiro Ishii, oh-m-sha, 1998; pp. 106-107.

Davison, et al.; Bootstrap Methods and Their Application, Cambridge University Press; Oct. 28, 1997; pp. 78-81.

* cited by examiner

METHOD AND SYSTEM FOR DETECTING DIFFERENCE BETWEEN PLURAL OBSERVED RESULTS

FIELD OF THE INVENTION

The present invention relates to a method and system for detecting a difference between a set of observed results, and in particular, the present invention relates to a method and system for statistically analyzing the difference between time series data sets.

BACKGROUND OF THE INVENTION

Detecting and analyzing anomalies of dynamic systems is an important technical challenge in various areas in the manufacturing industry. For example, anomaly detection in a production line has been of particular importance, and a lot of statistical techniques have been developed for quality control purposes. However, most of the traditional statistical quality control techniques are based on a strong assumption of multivariate normal distribution. Unless the system of interest is relatively static and stationary, the distribution of data is far from the normal distribution in general. This is especially the case in the analysis of automotives, where the system is highly dynamic and the definition of the normal state is not apparent. As a result, the utility of such traditional approaches is quite limited in many cases.

The following points may be considered on anomaly detection and analysis of cars:

1. From each component of an automobile, hundreds of time series data are observed.

2. The types of observed time series data can be various; for example, the values could be discrete in some variable, and be continuous in another.

3. The intervals of observations (or sampling interval) can be also various depending on the types of observed values.

4. The knowledge of individual engineers may be incomplete; they may not always make a valid decision based on experimental data.

Heretofore, a typical approach to anomaly detection and analysis is limit-check or its variant, where an observed value is compared to a threshold (or reference) value that has been predetermined using some algorithm. Based on limit-check, a rule-based system is often implemented, which enables, at least in principle, making a decision on a detected fault, based on a rule that "if a certain kind of observed value is larger than a predetermined reference value, a user is informed of an occurrence of anomaly". However, in highly dynamic systems such as an automobile, the trend of a variable can be greatly changed over time. Thus it is difficult to determine the reference value of a variable for detecting anomalies. While experienced engineers may be able to make a decision on the state of the system based on such complicated numerical data, it is unrealistic to assume that enough manpower of experienced engineers is available in every phase and place of anomaly detection. In addition, the knowledge of experienced engineers is often hard to translate to specific mathematical rules used in the limit-check routine. To summarize, the applicability of limit-check in combination with partial human knowledge is seriously limited in general. Accordingly, if there is an anomaly detection method that works more effectively than limit-check, or complementarily functions in addition to the limit-check, time and effort for an anomaly diagnosis will be greatly reduced.

Generally, test experiments are performed on a certain round basis. For example, in a case of an automobile, one experimental round can be one lap of a test course. This experimental round is referred as a run. When an automobile goes round the test course n-times, observed values of n runs, that is, n time series data sets of each kind of observed values are obtained. In general, it is difficult to make test conditions in all the runs exactly the same since the complexity of the system is too high to completely control their values. The time series data sets in individual runs may be different from one another more or less. In conventional techniques, it is hard to handle such fluctuations in experimental conditions, so that a substantial status of a diagnosis target cannot be appropriately characterized in many cases.

In addition, the tendency of variations in observed values are greatly different among types of observed values. Moreover, since the number of variables of the system is very large, considering all combinations of the variable is computationally prohibitive.

SUMMARY OF THE INVENTION

The present invention provides a method for analyzing time series data for each observation variable of a plurality of observation variables through execution of a program by a processor of an information processing apparatus that comprises a display unit, said method comprising performing for each observation variable:

acquiring an initial first time series data set consisting of a first plurality of first observed values over a first period of time, followed by generating an initial first cumulative probability distribution from the initial first time series data set, said initial first time series data set being designated as a previous first time series data set;

acquiring an initial second time series data set consisting of a second plurality of second observed or computed values over a second period of time, followed by generating an initial second cumulative probability distribution from the initial second time series data set, said initial second time series data set being designated as a previous second time series data set;

calculating an initial score as a function of an absolute value of a difference between respective cumulative probability values of the generated initial first cumulative probability distribution and the generated initial second cumulative probability distribution, said initial score being designated as a previous score;

performing operations on the previous first time series data set, including: generating a next first time series data set by adding newly-obtained first observed values at first additional times to the previous first time series data set, followed by generating a next first cumulative probability distribution from the next first time series data set;

performing operations on the previous second time series data set, including: generating a next second time series data set by adding newly-obtained second observed or computed values at second additional times to the previous second time series data set, followed by generating a next second cumulative probability distribution from the next second time series data set;

calculating a next score as said function of an absolute value of a difference between respective cumulative probability values of the generated next first cumulative probability distribution and the generated next second cumulative probability distribution;

ascertaining whether a condition exists,
  wherein the condition is that the next score has been calculated a specified maximum number of times equal to at least 1 or an absolute value of a difference between the next score and the previous score is not greater than a specified tolerance, and wherein if said ascertaining ascertains that the condition exists then outputting the next score as a detection result to the display unit, otherwise setting the previous first time series data set equal to the next first time series data set, setting the previous second time series data set equal to the next second time series data set, setting the previous score equal to the next score, and again executing said performing operations on the previous first time series data set, said performing operations on the previous second time series data set, said calculating the next score, and said ascertaining.

The present invention provides a method for analyzing time series data for each observation variable of a plurality of observation variables through execution of a program by a processor of an information processing apparatus that comprises a display unit, said method comprising, for each observation variable, processing time series data for an ordered sequence of time periods 1, 2, ..., J such that J is at least 3, wherein said processing for time period 1 comprises acquiring a new time series data set 1 having N1 observed values for the time period 1 and generating a first cumulative probability distribution (Pcomb,1) from the new time series data set 1, and wherein said processing for time period j (j=2, 3, ..., J) comprises the steps of:

(a) acquiring a new time series data set j having N1 observed values for the time period j;

(b) generating a new cumulative probability distribution (Pnew,j) from the new time series data set j;

(c) generating a combined cumulative probability distribution (Pcomb,j) equal to $\beta$*Pnew,j+(1−$\beta$)*Pcomb,j−1, wherein $\beta$=N2/(N1+N2), and wherein N2=(j−1)*N1;

(d) computing a score equal to the difference of Pcomb,j and Pcomb,j−1; and (e) outputting the score as a detection result to the display unit.

BRIEF DESCRIPTION OF THE DRAWINGS

For a more complete understanding of the present invention and the advantage thereof, reference is now made to the following description taken in conjunction with the accompanying drawings.

DETAILED DESCRIPTION OF THE INVENTION

Hereinafter, the present invention will be described by using an embodiment of the present invention. However, the following embodiment does not limit the present invention according to the scope of claims, and all the combinations of features described in the embodiment are not always required for solving means of the invention.

Figure 1:
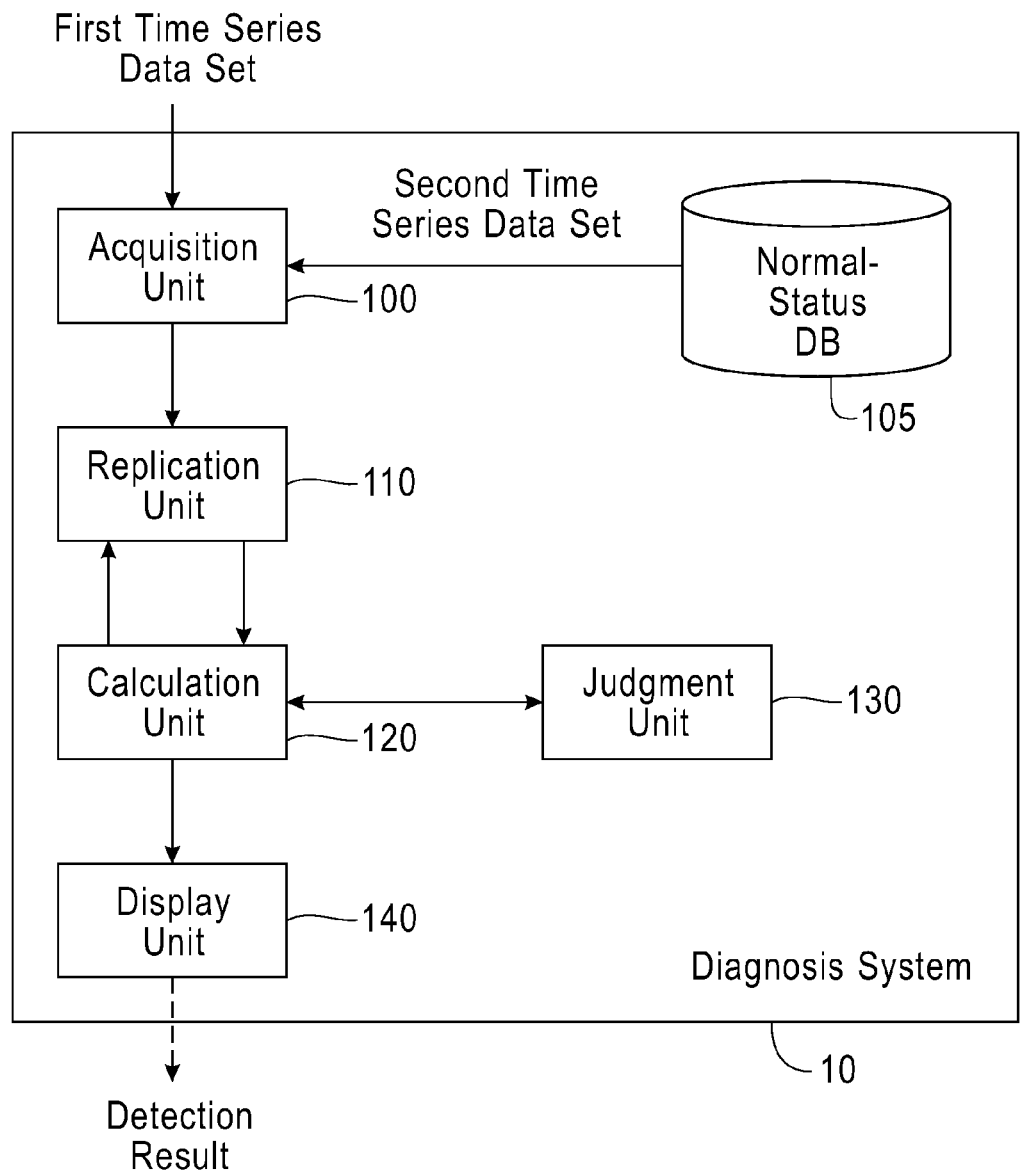
FIG. 1 shows a functional structure of a diagnosis system.

FIG. 1 shows a functional configuration of a diagnosis system 10. The diagnosis system 10 includes an acquisition unit 100, a normal-status database (DB) 105, a replication unit 110, a calculation unit 120, a judgment unit 130 and a display unit 140. The acquisition unit 100 acquires a first time series data set from outside for each observation variable of a plurality of observation variables, and acquires a second time series data set based on data in the normal-status DB 105. The first time series data set includes a plurality of observed values obtained by observing a certain observation target over time, and is to be used for detecting anomalies of the observation target. The second time series data set for each observation variable includes a plurality of observed values obtained by observing another observation target over time on a period different from the first data set. The normal-status DB 105 stores at least one time series data set obtained as the result of an observation of the observation target in its normal status.

In a case where the normal-status DB 105 stores a plurality of time series data sets, the acquisition unit 100 may acquire any one of the time series data sets as the second time series data set, or may acquire, as the second time series data set, the time series data set obtained for the observation period of the time length closest to that of the observation period of the first time series data set. Alternatively, the acquisition unit 100 may create a new time series data set, and acquire the new data set as the second time series data set. To be more precise, in a case where a time series data set is regarded as a vector of observed values, the new time series data set is the one minimizing the sum of the squares of the inter-vector distances between the new time series data set and each time series data set obtained from the observation target in a normal status.

The replication unit 110 creates a first replicated data set that is a replica of the first time series data set, by repeatedly sampling a plurality of observed values with replacement from the first time series data set. The replication unit 110 may create the first replicated data set by repeatedly sampling, with replacement, observed values of the number greater than that of observed values included in the first time series data set. Then, the replication unit 110 may create a second replicated data set that is a replica of the second time series data set, by repeatedly sampling a plurality of observed values with replacement from the second time series data set. Instead, the replication unit 110 may create the first replicated data set by directly using the first replicated data set without change, and may create the second replicated data set by repeatedly sampling a plurality of observed values with replacement from the second time series data set.

The calculation unit 120 calculates a score for each observation variable, said score indicating the difference between the first time series data set and the second time series data set, on the basis of the difference between a probability value in the cumulative probability distribution of the first replicated data set, and a probability value in the cumulative probability distribution of the second replicated data set, with respect to the same kind of observed values. Each kind of observed value pertains to a different observation variable of the plurality of observation variables. Then, the calculation unit 120 outputs the score for each observation variable to the display unit 140. The second replicated data set needs to include only at least a part of the second time series data set. The second replicated data set may be the second time series data set as it is, or may be a replicated data set that the replication unit 110 creates by repeatedly sampling observed values with replacement from the second time series data set. In addition, any kind of score may be employed as long as the score is based on the difference between a probability value in the cumulative probability distribution of the first replicated data set, and a probability value in the cumulative probability distribution of the second replicated data set, with respect to the observed values for the same observation variable. Accordingly, the score may be the maximum value of the difference between the cumulative probability values of the observed values for each observation variable, or may be a value based on the mean or the sum of the absolute value of the difference between the cumulative probability values of the observed values for each observation variable. The score thus calculated indicates the difference between the first time series data set and the second time series data set for each observation variable. In a case where the second time series data set is a time series data set representing data in a normal status, this score indicates a degree of anomaly occurring in an observation variable.

The judgment unit 130 judges whether or not the score has converged on a predetermined value as a result of repeated sampling with replacement. Specifically, in a case where the replication unit 110 sequentially creates a plurality of replicated data sets of each of the first time series data set and the second time series data set with an increase of the number of times of sampling, the updated replicated data sets are sequentially supplied to the calculation unit 120. In this case, the calculation unit 120 recalculates the score every time the replicated data is updated. Then, the judgment unit 130 judges whether or not the difference between a previous score and a current score is equal to or less than a predetermined reference value. Here, the previous score is based on the difference between the probability value in the cumulative probability distribution of a previously-created first replicated data set, and the probability value in the cumulative probability distribution of a previously-created second replicated data set, with respect to the same observation variable. Then, the current score is based on the difference between the probability value in the cumulative probability distribution of a currently-created first replicated data set, and the probability value in the cumulative probability distribution of a currently-created second replicated data set, with respect to the same observation variable. On condition that this difference between the scores is equal to or less than the reference value, the judgment unit 130 outputs the current score to the display unit 140. Instead, regardless of the result of a convergence judgment, the calculation unit 120 may output a calculated score when the number of times of sampling reaches a specified number of times equal to at least 2.

All the foregoing units perform the same processing as the above for each observation variable. Specifically, the acquisition unit 100 acquires a first time series data set and a second time series data set corresponding to each observation variable. The replication unit 110 creates a first replicated data set and a second replicated data set corresponding to each observation variable. In addition, the calculation unit 120 calculates a score corresponding to each observation variable. Then, the display unit 140 displays information indicating the observation variables, and the respective scores in association with each other in descending order of the calculated scores. This allows a user to easily recognize a place with a strong probability that anomaly occurs, or a combination of places where anomaly occurs. In order to further facilitate the anomaly detection, the calculation unit 120 may calculate an index indicating a relationship among plural kinds of observation variables, and the display unit 140 may display the index together with the above information and score. For a method for calculating such an index, see a reference to Tsuyoshi Ide and Keisuke Inoue, "Knowledge Discovery from Heterogeneous Dynamic Systems using Change-Point Correlations" in Proceedings of 2005 SIAM International Conference on Data Mining, Apr. 21-23, 2005, pp. 571-576.

Figure 2:
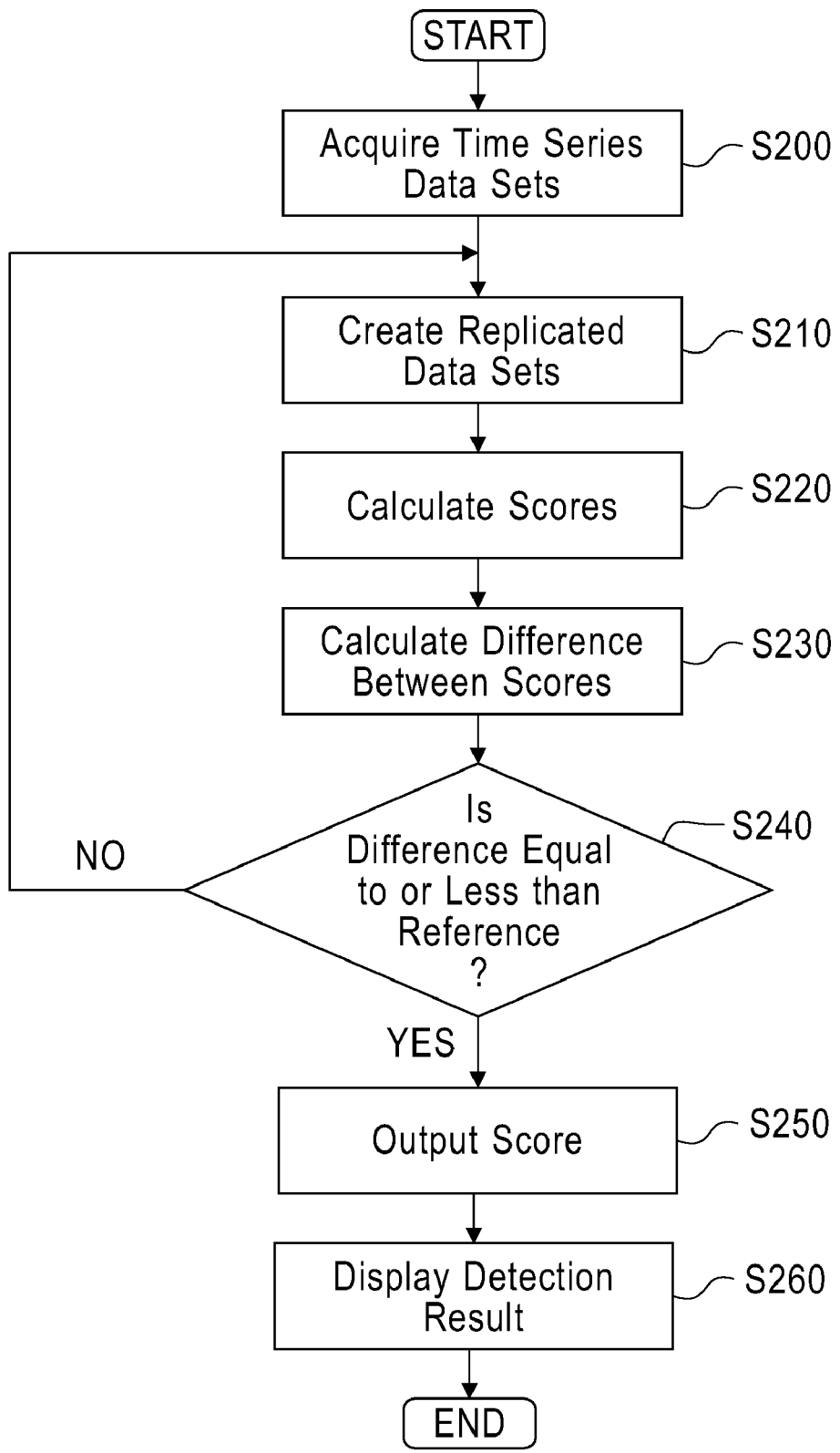
FIG. 2 shows a flowchart of a process in which the diagnosis system creates a detection result of anomaly.
Figure 3:
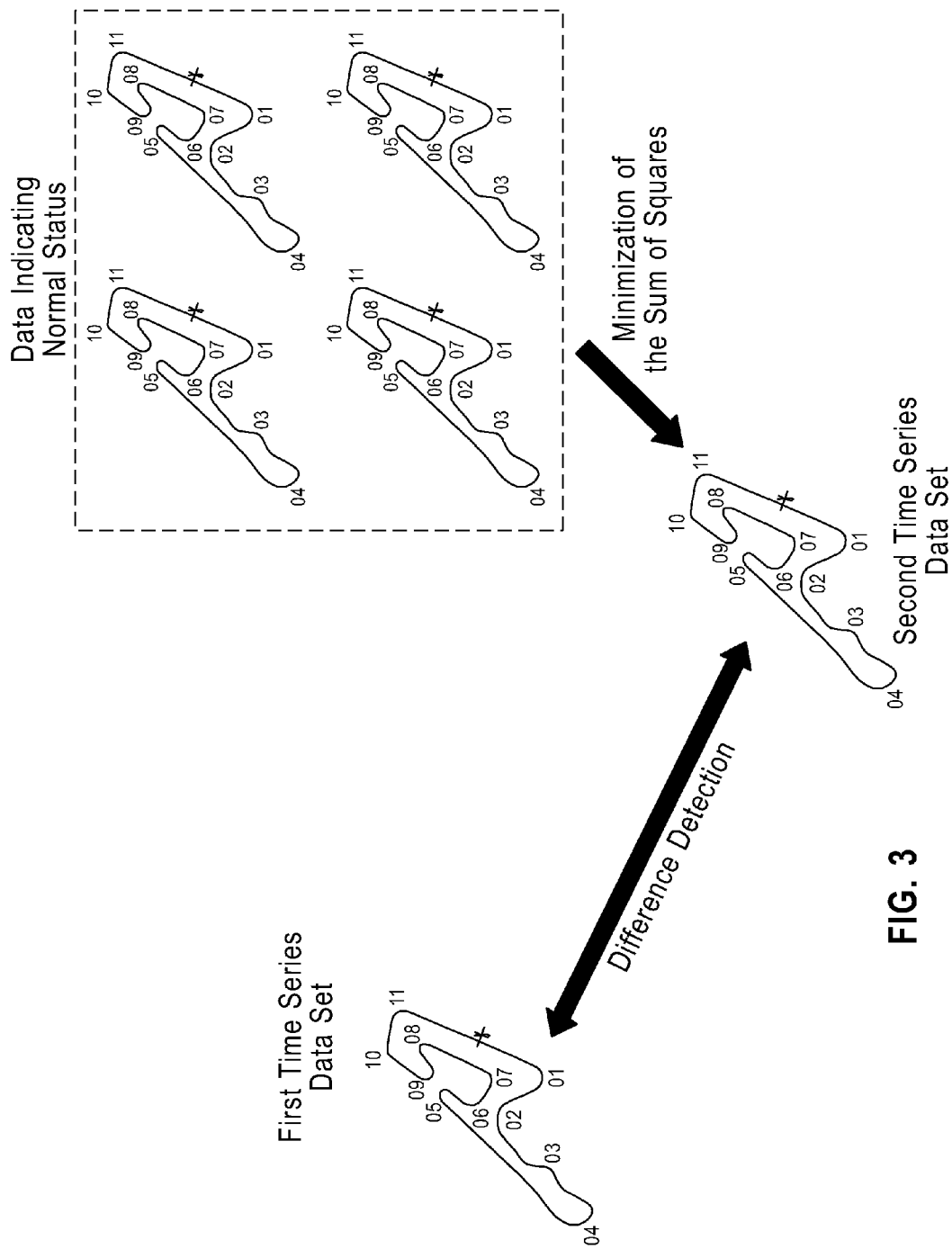
FIG. 3 is a conceptual diagram of a process in which a first time series data set to be diagnosed is compared with a second time series data set indicating a normal status.

FIG. 2 shows a flowchart of processing in which the diagnosis system 10 creates a result of anomaly detection. The acquisition unit 100 acquires the first time series data set and the second time series data set (S200). FIG. 3 shows an outline of a method for acquiring the second time series data set.

FIG. 3 is a conceptual diagram of a process in which a first time series data set to be diagnosed is compared with second time series data sets each representing a normal status of an observation variable. In a case where the normal-status DB 105 stores four time series data sets each representing the normal status as shown to the right upper side in FIG. 3, it is desirable to create one second time series data set by using these four sets, and then to compare the first time series data set with the second time series data set thus created. For example, in a case where a time series data set is regarded as a vector of observed values, the acquisition unit 100 may create a new time series data set that minimizes the sum of the squares of the inter-vector distances between the new time series data set and each of these four time series data sets. The following describes a specific example of this creating method.

In order to explain the creating method in a generalized manner, it is assumed that the normal-status DB 105 stores m time series of each observation variable i, and that each time series is expressed as a column vector $x_i^{(r)}$, where r is an integer value from 1 to m and specifies a different experimental run, wherein the integer i indicates the $i^{th}$ observation variable. Each time series $x_i^{(r)}$ includes p different time points so that $x_i^{(r)}$ is a p-dimensional vector. Note that the numbers of observed values included in the respective time series data sets are often different from one another for each observation variable. This results from a difference in the observation period or the observation intervals. In this embodiment, the acquisition unit 100 executes preprocessing so that each time series data set would include p observed values. Specifically, the acquisition unit 100 interpolates a lacking observed value on the basis of observed values obtained before and after the lacking observed value, or excludes an unnecessary observed value.

Instead of handling each of the m time series separately, the present invention finds a representative vector $u_i$ having p values therein, wherein $u_i$ maintains the essential features of the m time series (m>1). In accordance with the above definition, the set m time series for the i-th variable each representing the normal status is expressed as the following p-by-m matrix shown in Equation 1.

$$H_i(x) = [x_i^{(1)}, \ldots, x_i^{(m)}]$$ Equation 1

A time series data set is created as a second time series data set, namely the p dimensional vector $u_i$. Here, a normalization condition $u_i^T u_i = 1$ is assumed, where the superscript $^T$ denotes the transposition. Thus, $u_i^T$ is the transpose of $u_i$. One natural principle for finding $u_i$ is to minimize the sum of squares error function between the extracted representative vector $u_i$ and the original m time series. Since $x_i^{(r)}$ amounts to projecting $(u_i^T x_i^{(r)})$ on the one-dimensional space spanned by $u_i$, the sum-of-squares error function is defined in the following Equation 2:

$$E(u_i) = \sum_{r=1}^{m} \|(u_i^T x_i^{(r)})u_i - x_i^{(r)}\|^2 \quad \text{Equation 2}$$

The second time series data set to be determined is $u_i$ that minimizes the above sum of the squares. The following Equation 3 shows a derivation process.

$$\begin{aligned}
u_i &= \operatorname*{argmin}_{u} \sum_{r=1}^{m} \|(u^T x_i^{(r)})u - x_i^{(r)}\|^2 \quad \text{Equation 3} \\
&= \operatorname*{argmin}_{u} \sum_{r=1}^{m} \left[ -(u^T x_i^{(r)})^2 + x_i^{(r)T} x_i^{(r)} \right] \\
&= \operatorname*{argmax}_{u} \left[ u^T \sum_{r=1}^{m} x_i^{(r)} x_i^{(r)T} u \right] \\
&= \operatorname*{argmax}_{u} [u^T H_i H_i^T u]
\end{aligned}$$

When the constraint $u_i^T u_i = 1 = 1$ is incorporated into the above equation by using a Lagrangian coefficient $\lambda$, this problem becomes an eigenvalue problem shown in an Equation 4. What is to be determined is an eigenvector $u_i$ corresponding to the maximum eigenvalue $\lambda$. In short, the procedure is exactly to find the maximum left-singular vector of a matrix H. For more detailed descriptions of the singular value decomposition, Refer to Japanese translated version of "Linear Algebra and Its Applications," written by Gilbert Strang, published by Sangyo-Tosho, 1978, for example.

In addition, such a feature extraction method is called the Karhunen-Loeve transform, or the like (for example, refer to Ishii Kenichiro, et. al., "*Pattern Ninshiki* (Pattern Recognition)," Ohmusha, 1998). Equation 3 is now reduced to the eigenequation as $$H_i H_i^T u_i = \lambda u_i \quad \text{Equation 4}$$

wherein $H_i^T$ is a transposed matrix of $H_i$. The representative p-dimensional vector $u_i$ for observation variable i is found as the eigenvector corresponding to the maximum eigenvalue $\lambda$. Mathematically, this is the same as performing the singular value decomposition (SVD) for $H_i$ and taking the leading left singular vector. When the size of the matrix is large, several techniques to reduce the computational cost are available. As the result it is known in the field of data mining that SVD can be executed at the same calculation cost as that of other indexing methods such as the discrete Fourier transform, the wavelet transformation and the piecewise aggregate approximation (For example, refer to E. Keogh, K. Chakrabarti, M. J. Pazzani, S. Mehrotra, "Dimensionality reduction for fast similarity search in large time-series databases," Knowledge and Information Systems, 3 (2001) 263-286)) In other words, by executing the SVD according to such an algorithm, the acquisition unit 100 can efficiently solve the eigenvalue problem shown in the equation 4, and thereby can efficiently create a new second time series data set that minimizes the sum of the squares of differences between the second time series data set and each of the time series data sets stored in the normal-status DB 105.

Returning to FIG. 2, the replication unit 110 creates the first replicated data set and the second replicated data set by repeatedly sampling with replacement a predetermined number of times (S210). For example, this predetermined number of times may be equal to the number of observed values, or an integral multiple of a predetermined integer, such as 2, of the number of observed values. For detailed descriptions of a method for creating a replicated data set by repeated sampling with replacement, refer to A. C. Davison, D. V. Hinkley, "Bootstrap Methods and Their Application," Cambridge University Press (Oct. 28, 1997).

After calculating the cumulative probability distribution of the first time series data set and the cumulative probability distribution of the second time series data set, the calculation unit 120 calculates a score indicating the difference between the first time series data set and the second time series data set on the basis of the difference between the cumulative probability value in the cumulative probability distribution of the first time series data set, and the cumulative probability value in the cumulative probability distribution of the second time series data set with respect to the same observation variable (S220). For each observation variable, the cumulative probability distribution may be calculated by any method known by a person of ordinary skill in the art. For example, the cumulative probability distribution may be calculated for an observation variable by expressing the first or second first time series data set as a frequency distribution in the form of a probability density function in the observation variable, followed by integrating the probability density function from the lowest value of the observation variable to successively higher values of the observation variable to obtain the cumulative probability distribution normalized to a range of 0 to 1.

For the purpose of increasing efficiency in the calculation processing, the calculation unit 120 may exclude a predetermined range of observed values by assuming that the probability distribution in the predetermined range is not likely to vary, and then may calculate the difference between the probability value in the cumulative probability distribution of the first time series data set, and the probability value in the cumulative probability distribution of the second time series data set with respect to the same observation variable. For example, in a case where it is obvious that values for a semi-discrete variable within a certain range are continuous values, the calculation unit 120 may exclude the values within the range, and then may calculate the score.

This calculated score may be a score known as a Kolmogorov-Smirnov (KS) statistic (hereinafter, referred to as a score D). To be more precise, the KS statistic indicates the maximum absolute value of the difference between the probability value in the cumulative probability distribution of the first replicated data set, and the probability value in the cumulative probability distribution of the second replicated data set, with respect to each of the observed values. The KS statistic takes a value within a range of 0 to 1, i.e., takes 0 if no difference exists, and takes 1 if the absolute value of the difference is the maximum. Equation 5 shows a definition of the score D, where the subscripts N and T represent the normal and the target data. By using the KS statistic, it is possible to appropriately recognize a substantial status variation even when an observation period is changed due to a change in an observation environment; an observed value becomes the predetermined multiple of its usual value due to a change in certain conditions; or a value is observed by adding a predetermined offset value to (by subtracting the offset value from) an observed value.

[Formula 5]

$$D_i = \max_x |F_N(x) - F_T(x)| \quad \text{Equation 5}$$

Figure 4:
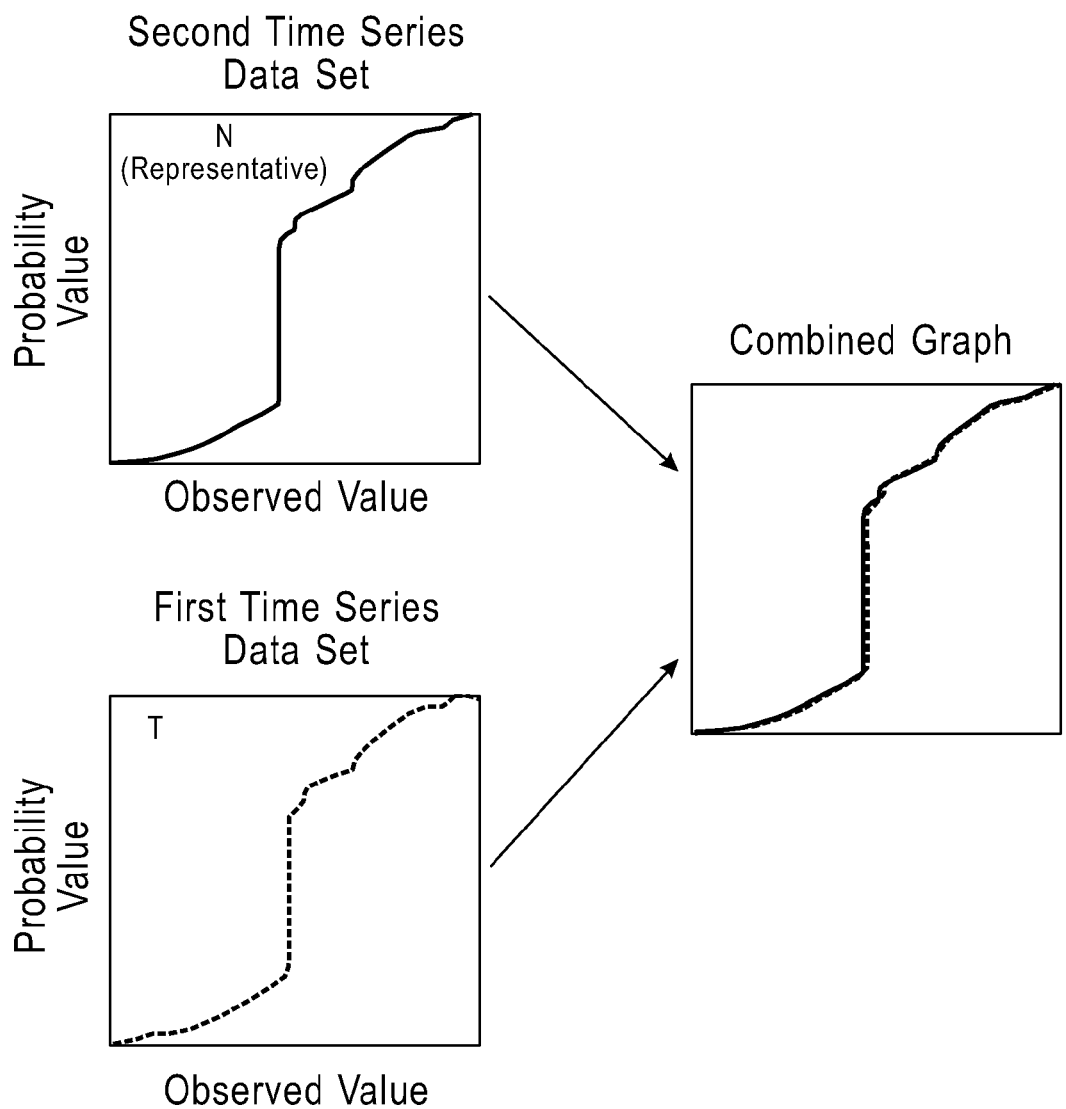
FIG. 4 shows an example of a process in which a score is calculated on the basis of an original time series data set instead of a replicated data set.

FIG. 4 shows an example of the process for calculating a score D on the basis of an original time series data set instead of a replicated data set. By referring to FIG. 4, a problem in a case of comparison using the original time series data set instead of the replicated data set is pointed out, and effectiveness using the replicated data set is explained. The left-upper part of FIG. 4 shows a graph indicating a cumulative probability distribution of a second time series data set in a solid line. The left-lower part of FIG. 4 shows a graph indicating a cumulative probability distribution of a first time series data set in a dotted line. In these cumulative probability distributions, observed values vary uncontinuously around the central part of the graph. Specifically, the probability that an observed value obtained from an observation target takes a certain value is very high, and the probability that the observed value takes a different value is very low, though it may happen sometimes. Suppose that, when obtained observed values take a certain value in a concentrated manner as described above, the observed value is called a semi-discrete observed value, and that a variable to which the semi-discrete observed value is assigned is called a semi-discrete variable.

A large number of semi-discrete observed values are observed from an observation target such as an automobile. For example, only discrete values can be inherently obtained from the gear position and the shift position. Moreover, like an accelerator opening degree, there is also an observed value that is more likely to take 0 (when not pressing down on the accelerator) or 100 (when pressing down on the accelerator completely) in light of usual usage thereof. In addition, there is a case where observed values that are inherently continuous values become semi-discrete due to limited resolution. An example of this case is that the performance of a thermometer only allows a temperature to be measured with accuracy of 1° C. Smoothing and resampling processing or inclusion of noise may cause such semi-discrete variables not to be completely discrete.

It should be noted that, although the automobile is illustrated as observation target in this embodiment, this embodiment can be also effectively applied to any observation target other than the automobile as long as such semi-discrete observed value are observed from the observation target. For instance, as the observed value, the diagnosis system 10 may observe an economical index such as a gross domestic product, a price of a stock or a bond. In this case, it is possible to detect anomaly occurring in an organization, such as a nation state or a company, which is an observation target.

The right part of FIG. 4 shows a graph in which the graph (a solid line) of the cumulative probability distribution of the second time series data set overlaps the graph (a dotted line) of the cumulative probability distribution of the first time series data set. The lines of the first and second time series data sets are almost identical. However, as shown in the central part of the graph, there is a slight difference in the observed values that are observed as discrete values. Since such a difference often results from the foregoing noise, the difference should not be detected as a substantial difference between the first time series data set and the second time series data set. Nevertheless, when the difference between the cumulative probability distribution of the first time series data set, and the cumulative probability distribution of the second time series data set is evaluated by using the score D that is the KS statistic, the difference becomes very significant.

In contrast, in this embodiment, the calculation unit 120 calculates the KS statistic indicating the difference between the first replicated data set and the second replicated data set instead of the first time series data set and the second time series data set. Each of the replicated data sets is obtained by repeatedly sampling observed values with replacement from the corresponding time series data set. When the number of times of resampling is set to be sufficiently large, the cumulative probability distribution is smoothed, and the part of a gradient ∞ is excluded. As a result, only a substantial feature in the probability distribution can be sampled.

Figure 5:
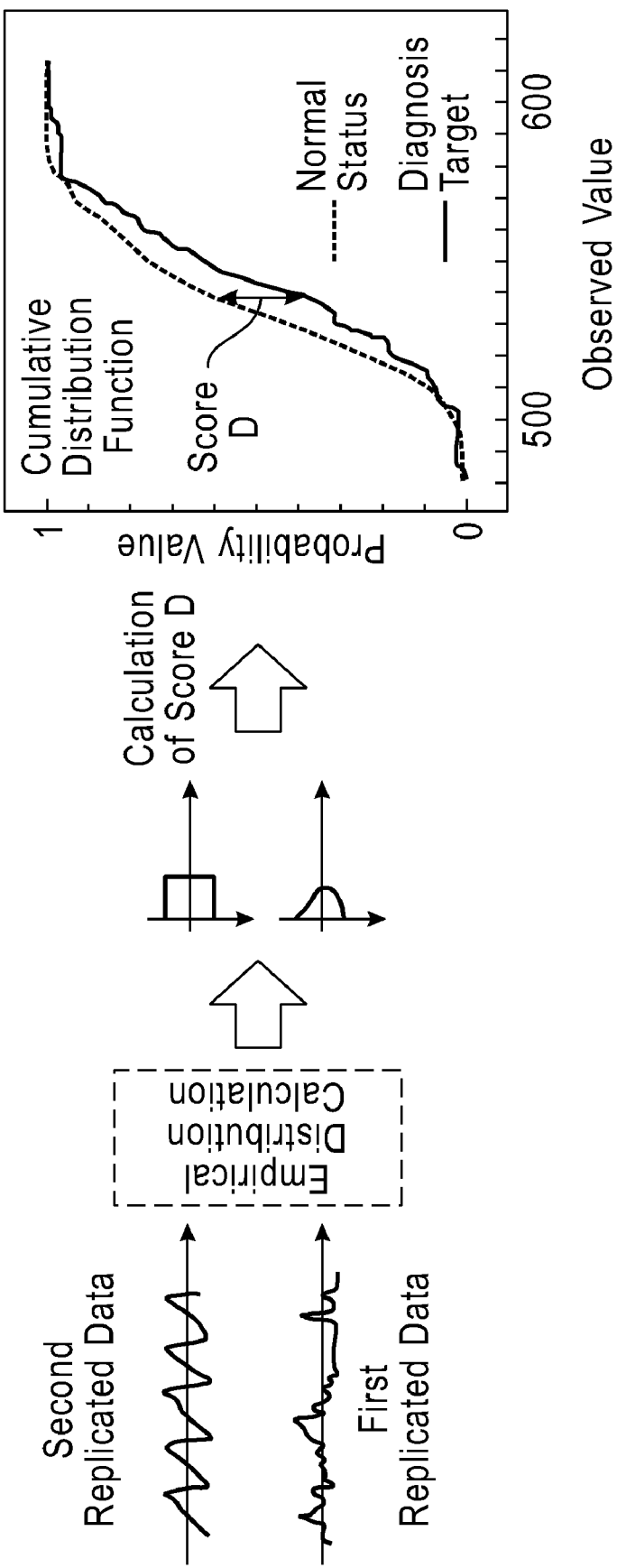
FIG. 5 shows an example of a calculation process of a score D.

FIG. 5 shows an example of the process for calculating a score D. The calculation unit 120 creates a probability distribution of a first replicated data set, and a probability distribution of a second replicated data set. If each of the replicated data sets is expressed as changes of observed values with the passage of time, probability distributions are each expressed as a set of probability values each corresponding to an observed value, and each indicating the probability of obtaining the observed value. Then, the calculation unit 120 creates a cumulative probability distribution of each of the probability distributions. A cumulative probability distribution is expressed as a cumulative value of the probability that each observation variable takes on a value less than or equal to a certain value. Thereafter, the calculation unit 120 calculates, as the score D, the maximum value of the difference between a probability value in the cumulative probability distribution of the first replicated data set, and a probability value in the cumulative probability distribution of the second replicated data set, with respect to the same observation variable.

Returning to FIG. 2, the judgment unit 130 calculates the difference between scores, one of which has been created in S220 in the previous execution of S210 to S240, and the other of which has been created in S220 in the current execution of S210 to S240 (S230). Then, on condition that the calculated difference is not equal to or less than a predetermined reference value (S240: NO) which is a specified tolerance, the judgment unit 130 causes the processing to return to S210. To be more precise, the replication unit 110 repeatedly performs sampling of observed values with replacement by increasing the number of times of repetition, and creates a new replicated data set by adding newly sampled observed values to the replicated data set created in the previous execution. This processing of S210 to S240 is repeated until the difference calculated in S230 becomes equal to or less than the reference value.

On condition that the difference between the scores converges to the reference value or below (S240: YES), the calculation unit 120 outputs the currently-calculated score to the display unit 140 (S250). After that, the display unit 140 displays the calculated score as a detection result of the difference between the first time series data set and the second time series data set (S260). Alternatively, on condition that the score exceeds a predetermined threshold value (for example, 0.4), the display unit 140 may notify a user of the observation variable corresponding to the score. The foregoing processing may be repeatedly preformed for each observation variable of the plurality of observation variables, and the display unit 140 may display a list of detection results of all of the observation variables.

Figure 6:
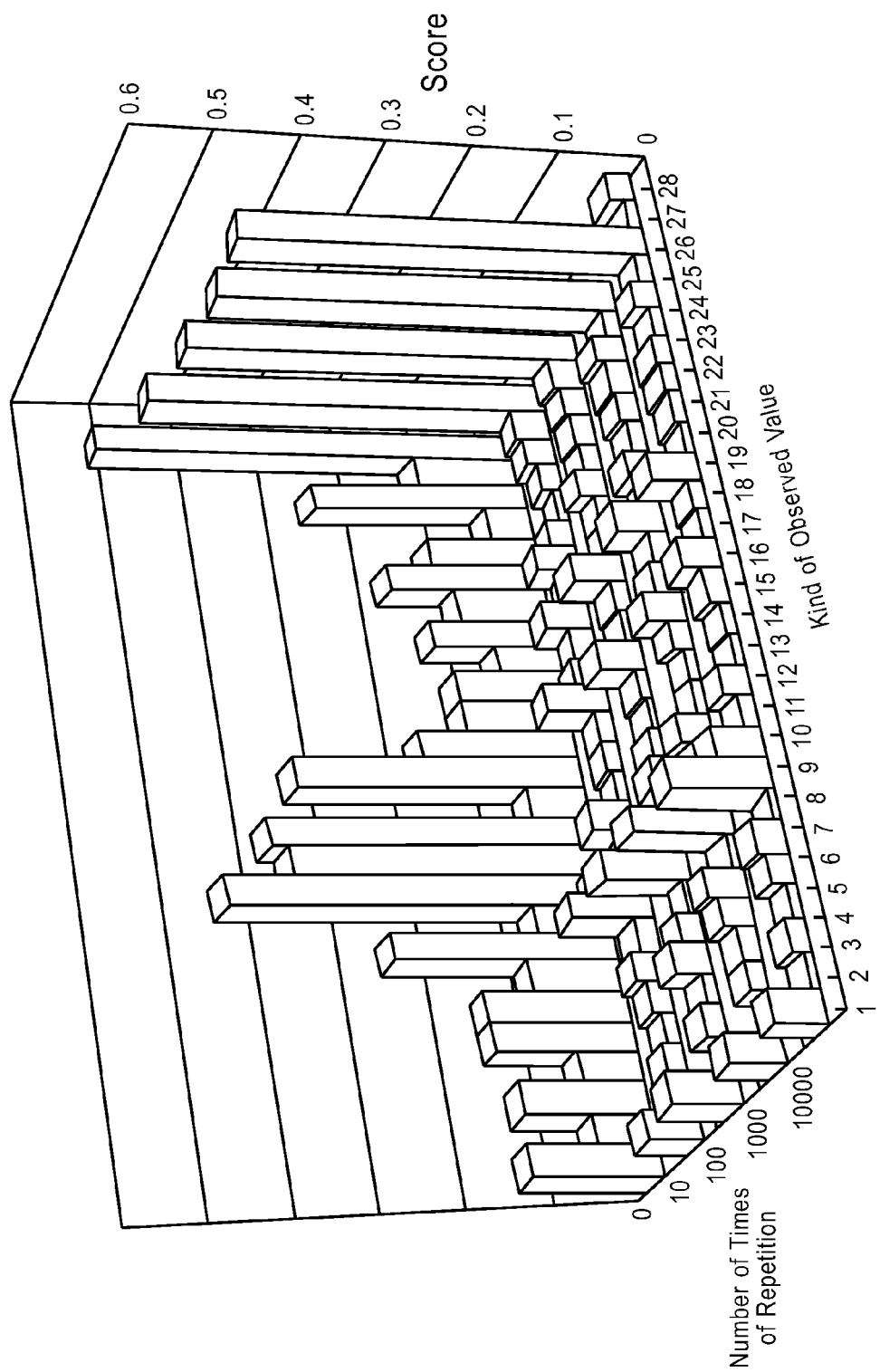
FIG. 6 shows a process in which scores D converge with an increase in the number of repetition times of sampling with replacement.

FIG. 6 shows a process in which scores D converge as the number of times of repeated sampling with replacement increases. In a graph shown in FIG. 6, the x-axis shows kinds of observed values, the z-axis shows the number of times of repeated sampling with replacement by indicating how many times larger than the number of observed values in the first time series data set and/or the second time series data set, and the y-axis shows the score D. By referring to FIG. 6, it is found that the score D of any observation variable hardly varies, when the number of repetition times exceeds about a 10-fold higher number than the number of observed values in the first time series data set and the second time series data set. Accordingly, it is understood that the number of repetition times of the processing shown in S210 to S240 is on the order of a several 10-fold higher number than the number of observed values. Alternatively, instead of the processing shown in FIG. 5, the replication unit 110 may repeatedly perform sampling with replacement the approximate several 10-fold higher number of times than the number of observed values in advance, and then the calculation unit 120 may calculate the score D only once by using the replicated data sets thus created. As shown in FIG. 6, it is understood that a sufficiently reliable score can be calculated by repeatedly sampling with replacement the approximate several 10-fold higher number of times than the number of observed values.

Figure 7:
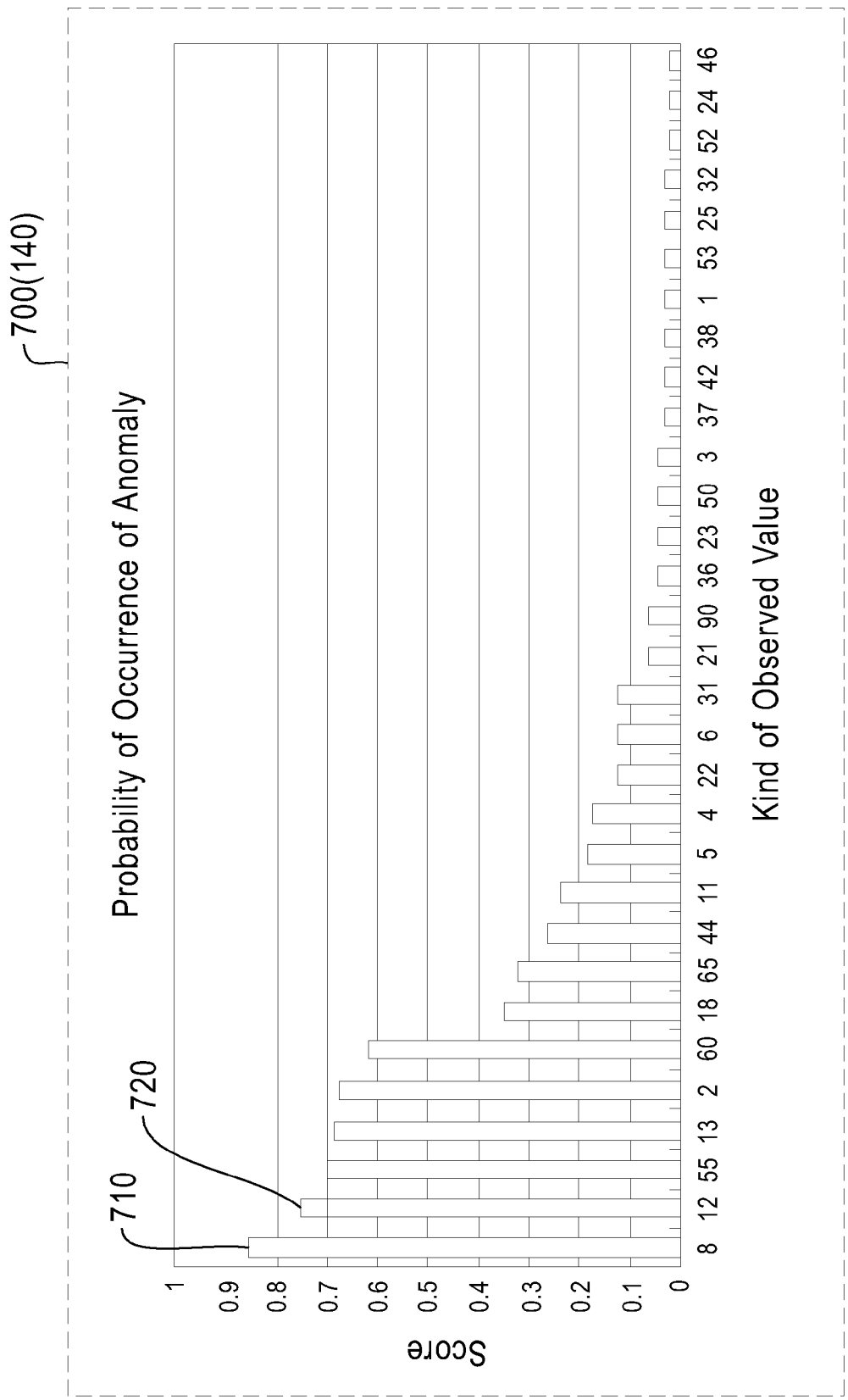
FIG. 7 shows an example of a screen on which a display unit displays a detection result.

FIG. 7 shows an example of a screen 700 on which a detection result is displayed by the display unit 140. On the screen 700, the display unit 140 displays information indicating plural, observation variables and scores, such as KS statistics, calculated from the respective observation variables in descending order of the calculated score. In a bar chart of FIG. 7, the observed values having the larger scores are displayed from the left-hand side in descending order. To be more precise, the display unit 140 shows a KS statistic of an observed value by using the length of a bar 710 in the bar chart, in association with an identification number 8 indicating the observation variable. Moreover, next to this bar on the right side, the display unit 140 shows a KS statistic of an observed value by using the length of a bar 720 in the bar chart, in association with an identification number 12 indicating the observation variable. The KS statistics become smaller in order of the identification numbers 8, 12, 55, 13, 2, 60, . . . , from the left side to the right side in the graph. Thus, with the display of the display unit 140, a user can recognize places in each of which there is a strong possibility that anomaly occurs, and the descending order of the possibilities. As a result, an automobile engineer can properly know components that should be diagnosed in detail preferentially, and the priority order, and then can work for a countermeasure against the anomaly more efficiently than otherwise.

Figure 8:
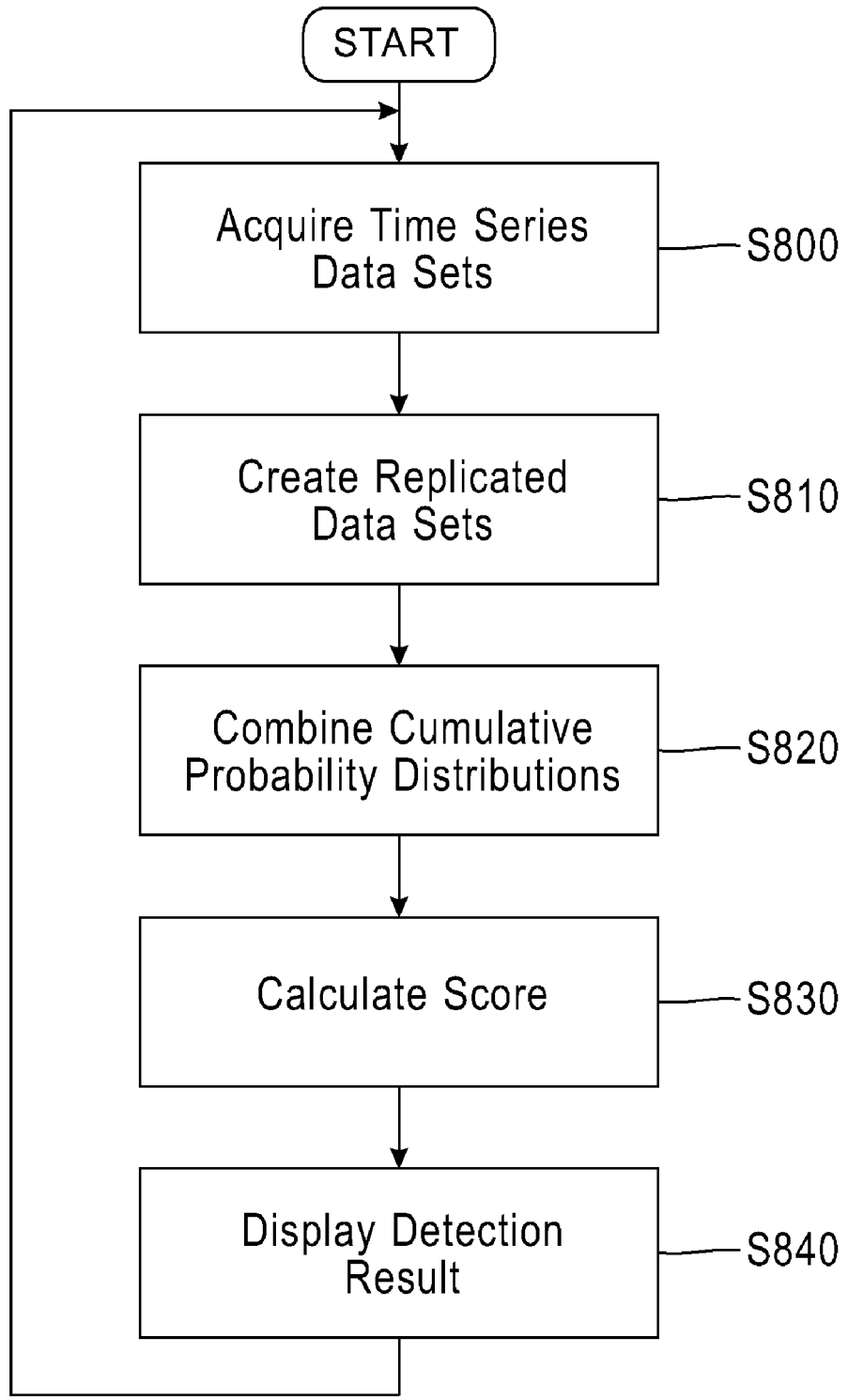
FIG. 8 shows a flowchart of a process of displaying a detection result of anomaly in a modified example of this embodiment.

FIG. 8 shows a flowchart of a real-time process for displaying a detection result of anomaly in a modified example of this embodiment. In this modified example, descriptions will be provided for an example of a process in which scores, such as the foregoing KS statistics, are dynamically updated by using observed values sequentially obtained while an observation target is being observed. In this modified example, even in a case where a new score is calculated every time an observed value is added to a time series data set, the new score is not calculated by using all the observed values from the beginning in every execution. Instead, the modified example aims to calculate the new score more efficiently by using a calculation result in the previous execution.

The acquisition unit 100 sequentially observes the observation target, and sequentially adds a time series data set including newly-obtained observed values to a time series data set including previously-obtained observed values. Thereby, the acquisition unit acquires a new first time series data set (S800) with a fixed window of length $N_1$. In other words, the acquisition unit 100 acquires a new first series data set including $N_1$ data points in every execution of S800. Then, the replication unit 110 creates a replicated data set of the time series data set including only the newly-obtained observed values, out of the acquired first time series data set (S810).

Note that there is a trade-off between the time resolution and the precision of the score. Specifically, for a smaller the window size, the time resolution of the real-time anomaly detection system will get better, while statistical errors for estimating the cumulative probability distribution will get larger, since the number of the data points within the window gets smaller. To handle this trade-off, the calculation unit 120 creates a cumulative probability distribution based on the replicated data set of the first time series data set, by combining a cumulative probability distribution based on the replicated data set of the time series data set including the newly-obtained observed value, with a cumulative probability distribution based on a replicated data set of the time series data set including the previously-obtained observed values (S820).

This combining is carried out according to a ratio of the number of newly-obtained observed values to the number of previously-obtained observed values. For example, a cumulative probability value of observation variable is calculated as a weighted average by using the numbers of newly-obtained and previously-obtained observed values as the weighting factors, respectively. One example is provided hereafter. Suppose that the previously-calculated cumulative probability value and the newly-calculated cumulative probability value of a certain observation variable are 0.4 and 0.5, respectively, and that the numbers of previously-obtained observed values and newly-obtained observed values are 9000 and 1000, respectively. In this case, the average thereof is calculated by weighting according to a ratio between the numbers of observed values 9:1, and thereby the probability value 0.41 is computed. Putting formally, if the D-scores of the previously observed data and the newly observed data are $S_2$ and $S_1$, respectively, the resulting score S is written as $\beta S_2 + (1-\beta) S_1$, where $\beta$ is a real number within 0 through 1, representing a discounting factor. One natural choice for the discounting factor is $N_2/(N_1+N_2)$, where $N_2$ is the window size (the number of data points) of the previously observed data.

Thereafter, the calculation unit 120 calculates a score such as a KS statistic indicating the difference between the combined cumulative probability distribution, and the previously-created cumulative probability distribution of the second replicated data set (S830). The calculated score is displayed as a detection result of the difference between the first time series data set and the second time series data set (S840). If the diagnosis system 10 continues to obtain observed values, the diagnosis system 10 causes the processing to return to S800, and subsequently updates the score.

According to this foregoing modified example, it is possible to recognize the status of an observation target in real time during the observation thereof. In addition, the score indicating the difference can be calculated quickly by using the previous calculation result.

The preceding discussion of FIG. 8 describes a method for analyzing time series data for each observation variable of a plurality of observation variables through execution of a program by a processor of an information processing apparatus that comprises a display unit. The method comprises, for each observation variable, processing time series data for an ordered sequence of time periods 1, 2, ..., J such that J is at least 3.

Processing the time series data for time period 1 comprises acquiring a new time series data set 1 having $N_1$ observed values for the time period 1 and generating a first cumulative probability distribution (Pcomb,1) from the new time series data set 1.

Processing the time series data for time period j (j=2, 3, ..., J) comprises the steps of:

(a) acquiring a new time series data set j having $N_1$ observed values for the time period j;

(b) generating a new cumulative probability distribution (Pnew,j) from the new time series data set j;

(c) generating a combined cumulative probability distribution (Pcomb,j) equal to $\beta$*Pnew,j+(1−$\beta$)*Pcomb,j−1, wherein $\beta=N_2/(N_1+N_2)$, and wherein $N_2=(j-1)*N_1$;

(d) computing a score of Pcomb,j−Pcomb,j−1; and (e) outputting the score as a detection result to the display unit.

In one embodiment, $N_1=1$. In another embodiment, $N_1>1$.

Processing the time series data for the time periods 1, 2, ..., J is performed in real time.

Figure 9:
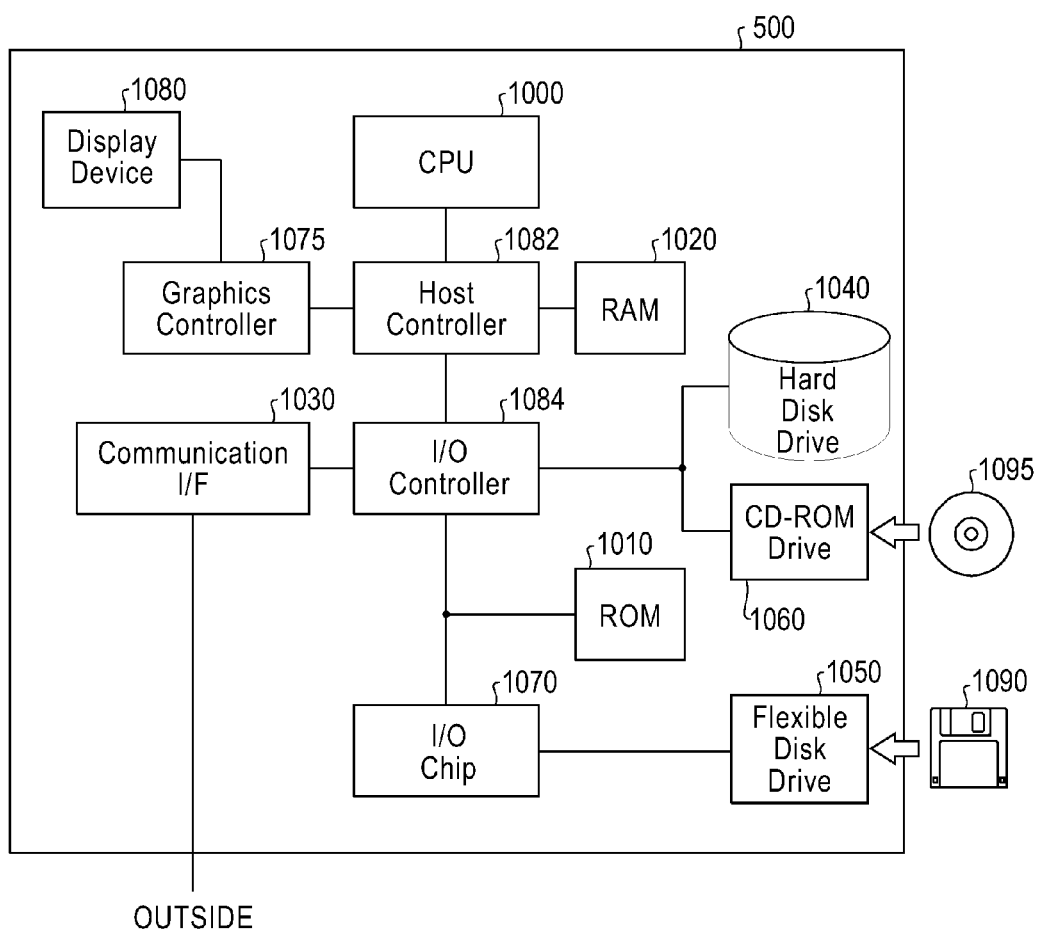
FIG. 9 shows an example of a hardware configuration of an information processing apparatus functioning as the diagnosis system in this embodiment or the modified example.

FIG. 9 shows an example of a hardware configuration of an information processing apparatus 500 functioning as the diagnosis system 10 in this embodiment or the modified example. The information processing apparatus 500 includes a CPU peripheral unit, an input/output unit and a legacy input/output unit. The CPU peripheral unit includes a CPU 1000, a RAM 1020 and a graphics controller 1075, all of which are mutually connected to one another via a host controller 1082. The input/output unit includes a communication interface 1030, a hard disk drive 1040 and a CD-ROM drive 1060, all of which are connected to the host controller 1082 via an input/output controller 1084. The legacy input/output unit includes a ROM 1010, a flexible disk drive 1050 and an input/output chip 1070, all of which are connected to the input/output controller 1084.

The host controller 1082 mutually connects the RAM 1020 to the CPU 1000 and the graphics controller 1075, both of which access the RAM 1020 at a high transfer rate. The CPU 1000 is operated based on programs stored in the ROM 1010 and the RAM 1020, and controls each of the components. The graphics controller 1075 obtains image data generated by the CPU 1000 or the like in a frame buffer provided in the RAM 1020, and causes the obtained image data to be displayed on a display device 1080. In place of this, the graphics controller 1075 may internally include a frame buffer in which the image data generated by the CPU 1000 or the like is stored.

The input/output controller 1084 connects the host controller 1082 to the communication interface 1030, the hard disk drive 1040 and the CD-ROM drive 1060, all of which are high-speed input/output devices. The communication interface 1030 communicates with an external device via a network. In the hard disk drive 1040, programs and data to be used by the information processing apparatus 500 are stored. The CD-ROM drive 1060 reads a program or data from a CD-ROM 1095, and provides the read-out program or data to the RAM 1020 or the hard disk 1040.

Moreover, the input/output controller 1084 is connected to relatively low-speed input/output devices such as the ROM 1010, the flexible disk drive 1050 and the input/output chip 1070. In the ROM 1010, stored are programs such as a boot program executed by the CPU 1000 at a start-up time of the information processing apparatus 500 and a program depending on hardware of the information processing apparatus 500. The flexible disk drive 1050 reads a program or data from a flexible disk 1090, and provides the read-out program or data to the RAM 1020 or the hard disk drive 1040 via the input/output chip 1070. The input/output chip 1070 is connected to the flexible disk drive 1050 and various kinds of input/output devices, for example, through a parallel port, a serial port, a keyboard port, a mouse port and the like.

A program to be provided to the information processing apparatus 500 is provided by a user with the program stored in a storage medium such as the flexible disk 1090, the CD-ROM 1095 and an IC card. The program is read from the storage medium via the input/output chip 1070 and/or the input/output controller 1084, and is installed and executed on the information processing apparatus 500. An operation that the program causes the information processing apparatus 500 or the like to execute, is identical to the operation of the diagnosis system 10 described by referring to FIGS. 1 to 8. Therefore, the description thereof is omitted here.

The program described above may be stored in an external storage medium. As the storage medium, any one of the following mediums may used: an optical storing medium such as a DVD and a PD; a magneto-optic storing medium such as an MD; a tape medium; and a semiconductor memory such as an IC card, in addition to the flexible disk 1090 and the CD-ROM 1095. Alternatively, the program may be provided to the information processing apparatus 500 via a network, by using, as a storage medium, a storage device such as a hard disk and a RAM, provided in a server system connected to a private communication network or the internet. A storage medium with the program stored thereon is a computer program product.

As has been described in this embodiment hereinabove, according to the diagnosis system 10, it is possible to detect anomaly occurring in an observation target by using plural kinds of observed values exhaustively without fully having knowledge of behavior of the observed values in advance. Moreover, a score indicating anomaly is calculated by repeatedly sampling observed values with replacement from a time series data set. As a result, the substantial status of the observation target can be diagnosed by excluding a slight difference between the observed values caused by a difference in an observation environment. This makes it possible to achieve an anomaly detection method that effectively functions instead of the conventional limit check, or complementally functions in addition to the limit check.

According to the present invention, it is possible to detect anomalies occurring in an observation target with high accuracy.

Hereinabove, the present invention has been described by using the embodiment. However, the technical scope of the present invention is not limited to the above-described embodiment. It is obvious to one skilled in the art that various modifications and improvements may be made to the embodiment. Moreover, it is also obvious from the scope of the present invention that thus modified and improved embodiments are included in the technical scope of the present invention.

What is claimed is:

1. A method for detecting a difference among a plurality of observation results, comprising:

acquiring, by an acquisition unit in a diagnosis system, the diagnosis system running on one or more processors, a first time-series data including a first plurality of observed values by observing a first observation subject over a first passage of time;

acquiring, by the acquisition unit in the diagnosis system, a second time-series data including a second plurality of observed values by observing a second observation target over a second passage of time;

extracting, by a replication unit in the diagnosis system, a first replicated plurality of observed values from the first time-series data by repeatedly sampling the first plurality of observed values;

generating, by the replication unit in the diagnosis system, a replicated first time-series data from the first replicated plurality of observed values;

extracting, by the replication unit in the diagnosis system, a second replicated plurality of observed values from the second time-series data by repeatedly sampling the second plurality of observed values;

generating, by the replication unit in the diagnosis system, a replicated second time-series data from the second replicated plurality of observed values;

calculating, by the calculation unit in the diagnosis system, an index value indicating a difference between the first time-series data and the second time-series data, based upon a difference between first probability values in a first cumulative probability distribution of the first replicated time-series data and second probability values in a second cumulative probability distribution of the second replicated time-series data, wherein the index value is calculated for observed values common to both the first replicated time-series data and the second replicated time-series data;

calculating, by a judgment unit in the diagnosis system, a tolerance based on a difference between the calculated index value and a previously calculated index value; and if the tolerance is larger than a reference value, calculating, by the diagnosis system, a new index value by resampling with replacement the first plurality of observed values and the second plurality of observed values including increasing a number of times of repetition of the resampling.

* * * * *